UNITED STATES PATENT OFFICE.

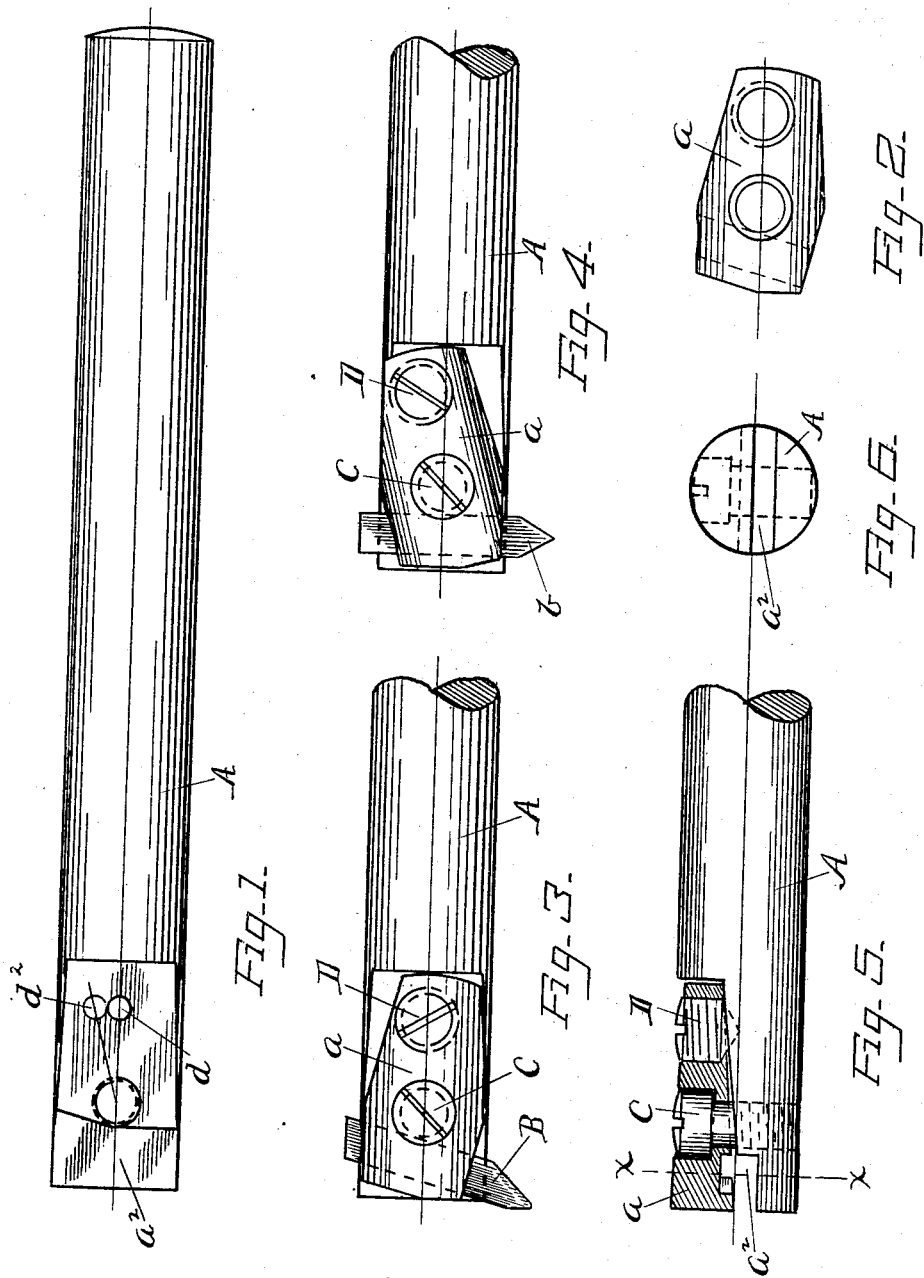

EDWARD F-G. GIBBS, OF WASHINGTON, DISTRICT OF COLUMBIA.

COUNTERBORING-TOOL.

1,219,097.  Specification of Letters Patent.  Patented Mar. 13, 1917.

Application filed January 22, 1915. Serial No. 3,772.

*To all whom it may concern:*

Be it known that I, EDWARD F-G. GIBBS, a citizen of the United States, residing at Washington, in the District of Columbia, have invented certain new and useful Improvements in Counterboring-Tools; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in the means of clamping the inserted cutter in a counter-boring tool, or shaft, commonly known as a boring bar, such as are held by special holders and used chiefly on engine lathes for boring metal, hereinafter fully described, shown in the accompanying drawings and then specifically defined in the appended claims.

The specific object of this invention is to obtain an acceptable design by which a straight shaft of suitable size and material may be economically converted into a boring bar in which a cutter may be inserted and clamped very rigidly without materially altering the diameter of the original bar, or obstructing its surface with members of the clamping mechanism without a special wrench and without employing detached parts, and a further object is to thus construct a tool adapted to boring a cylinder, for example to a sharp right angled bottom and adapted to right hand and left hand cuts.

I do not mean, however, to limit my rights and privileges to boring only or in any particular, except as required by the scope of the claims.

I obtain these objects by means of the mechanism illustrated in the accompanying drawings which form a part of this specification, and in which drawings:

Figure 1 is a plan view of the bar proper without any detachable parts.

Fig. 2 is a plan view of the lever clamp.

Fig. 3 is a plan view of the front end of the bar clamp and screws holding a boring cutter clamped in working position.

Fig. 4 is a plan view of the front end of the bar, clamp and screws holding a thread cutter clamped in working position.

Fig. 5 is a side elevation of the bar clamp and screws, the clamp being shown in section, and Fig. 6 is a view of the tool from the front end.

Reference now being had to the details of the drawings by letter, in which similar letters refer to similar parts throughout the several views, A designates the bar, a straight bar of uniform cross sectional figure and preferably cylindrical. It is the main element or body of the tool, reduced as if by a short diametrically and longitudinally disposed saw cut or split from its extreme front end, which cut tapers so that the bar size increases toward its rear end. The said cut terminates by uniting with a transverse cut, which union separates the lever clamp $a$ and bar, the length of which is governed by its function as a lever. $a^2$ designates the transversely disposed, angled, cutter-holding aperture of cutter size, formed between the bar and clamp, to both of which it appertains.

B designates the boring cutter held in the said aperture, the cutting edge of which projects forward beyond the end of the bar and clamp, while $b$ designates the thread cutter.

C designates the pull screw, located as near the aperture as practicable. It is a fillister head, crown-top machine screw, whose body passes freely through the clamp and has screw thread engagement in the bar. Its flat bottomed head sinks into a flat bottomed counter bore in the clamp by which it is obscured.

D designates the push screw, a short, pointed, crown-top, headless set screw. It also is obscured by sinking into the rear end of the clamp through which it extends with screw thread engagement, its point preferably entering one of the shallow spot holes $d$ or $d^2$ in the saw-cut surface of the bar from within which hole it pushes. In this construction the spot holes $d$ and $d^2$ govern the position or angle of the cutter, because the cutter's seat on the bar is a plane surface upon which it may be turned, while its position under the cap is in a close fitting channel, making it subject to the control of the said cap, which is hinged upon the pull screw C. Fig. 3 shows the push screw in position to engage spot hole $d$ which is in alinement with pull screw C. Therefore, the cap is in normal position and the boring cutter B is at favorite angle for boring. But in Fig. 4, the push screw is in position to engage spot hole $d^2$ which puts the thread cutter $b$ at a right angle to the axis of the bar, the advantage of this choice of position being apparent.

Fig. 5 shows that, when the cutter is inserted and the pull screw drawn down, the push screw being slack, the rear end of the clamp drops down a distance equal to the thickness of the saw-cut which disintegrated the original bar. This fact throws the strain on the pull screw under the front edge of the flat bottomed head. This point, therefore, becomes the fulcrum when the push screw is driven, the clamp becomes the lever, the push screw transmitting the power, while the cutter receives the pressure multiplied according to the increased remoteness of the push screw.

It is to be noted also that a tool of this type is not for the purpose of boring original holes but for counter boring or enlarging holes which already exist. Also that it is not for the purpose of boring only but for turning also (taking external cuts) in which case a left hand strain is thrown on the cutter, and for other purposes.

It is further to be noted that the stiffer (therefore the larger) the bar, the faster and better the work. Therefore, it is obviously necessary not to enlarge the front end of the bar in inserting the cutter or to obstruct its exterior surface with members of the clamping device. It is by no means essential that both members of a tool of this pattern be obtained by disintegrating the original bar, but the mere fact that the disintegrated member can be used and that so much of the work can be done with such apparent economy and accuracy before the disintegrating is done gives the design peculiar value.

Having thus described my invention, what I claim to be new and desire to secure by Letters Patent is:—

1. A counter-boring tool, comprising a straight cylindrical bar, the same having a portion of its body split away by a longitudinally disposed cut from its front end, a lever clamp fitted to the said cut, a transversely disposed cutter-holding aperture being formed between the said bar and clamp near their front ends, a cutter fitted within the said aperture, a pull screw adjacent to the said aperture which engages both clamp and bar, the head of which screw is countersunken into the member which it enters, and a headless push screw near the rear end of the said clamp, substantially as set forth.

2. A counter-boring tool, comprising a straight bar of uniform diameter in cross section, the same having a portion of its body split away by a longitudinally disposed cut from its front end, the said cut forming an acute angle with the axis of the bar, a lever clamp fitted to the said cut, a transversely disposed cutter holding aperture being formed between the said bar and clamp near their front ends, a cutter fitted within the said aperture, a pull screw adjacent to the said aperture which engages both bar and clamp, the head of which screw is countersunken into the member which it enters, and a headless push screw near the rear end of the said clamp, substantially as set forth.

3. A counter-boring tool, comprising a straight cylindrical bar, the same having a portion of its body split away by a longitudinally disposed cut from its front end, a lever clamp fitted to the said cut, a transversely disposed cutter-holding aperture being formed between the said bar and clamp near their front ends, a cutter fitted within the said aperture, a pull screw adjacent to the said aperture which engages both bar and clamp, the head of which screw is countersunken into the member which it enters, substantially as set forth.

4. A counter-boring tool, comprising a straight cylindrical bar, the same having a portion of its body cut from its front end on a plane approximately longitudinally disposed to its axis, a lever clamp fitted to the said cut, a transversely disposed cutter-holding aperture being formed between the said bar and clamp near their front ends, a cutter fitted within the said aperture, a pull screw, having a flat bottomed head which head enters a flat bottomed counter-bore adjacent to the said aperture, which screw engages both clamp and bar, and a push screw near the rear end of the said clamp which engages both clamp and bar, all of which screws and clamp, when clamped in working position, are within the limits of the peripheral surface of the bar extended, substantially as set forth.

5. A counter-boring tool, comprising a straight cylindrical bar, the same having a portion of its body split away by a longitudinally disposed cut from its front end, which cut forms an acute angle with the axis of the bar, a lever clamp fitted to the said cut, a transversely disposed cutter holding aperture being formed between the said bar and clamp near their front ends, a cutter fitted to the said aperture, a pull screw having a flat bottomed head, which head enters a flat bottomed counter-bore, adjacent to the said aperture and which screw engages both clamp and bar, and a push screw near the rear end of the said clamp, which engages both bar and clamp by extending through one and entering the other, substantially as set forth.

6. A counter-boring tool, comprising a straight cylindrical bar, the same having a portion of its body split away by a longitudinally disposed cut from its front end, a lever clamp fitted to the said cut, a transversely disposed cutter-holding aperture being formed between the said bar and clamp near their front ends, consisting of a plane surface and a channel, a pull screw adjacent to the said aperture which engages both clamp and bar, the head of which screw is countersunken into the member which it enters, and a headless push screw near the rear end of the said clamp, substantially as set forth.

7. A counter-boring tool, comprising a straight cylindrical bar, the same having a portion of its body split away by a longitudinally disposed cut from its front end, a lever clamp fitted to the said cut, a transversely disposed cutter-holding aperture being formed between the said bar and clamp near their front ends, a cutter fitted within said aperture, a pull screw adjacent to the said aperture which engages both clamp and bar, and means for multiplying the screw pressure of the clamp upon the cutter, all of which, clamp, screw and means are within the limits of the peripheral surface of the bar extended, substantially as set forth.

8. A counter-boring tool, comprising a straight cylindrical bar, the same having its body split by a longitudinally disposed cut at its front end, forming a lever clamp portion fitted to the said cut, a transversely disposed cutter-holding aperture being formed between the said bar and clamp portions at their front ends, a cutter fitted within the said aperture, in combination with push and pull screws through the said clamp portion for the purpose of multiplying the screw pressure upon the said cutter, substantially as set forth.

In testimony whereof I hereunto affix my signature in presence of two witnesses.

EDWARD F-G. GIBBS.

Witnesses:
 CHAS. F. FORSYTH,
 FRANKLIN N. HOUGH.

Copies of this patent may be obtained for five cents each, by addressing the "Commissioner of Patents, Washington, D. C."